J. M. HUBBARD.
Corn Husker.

No. 51,589.

2 Sheets—Sheet 1.

Patented Dec. 19, 1865.

WITNESSES

INVENTOR

J. M. HUBBARD.
Corn Husker.
No. 51,589.
2 Sheets—Sheet 2.
Patented Dec. 19, 1865.
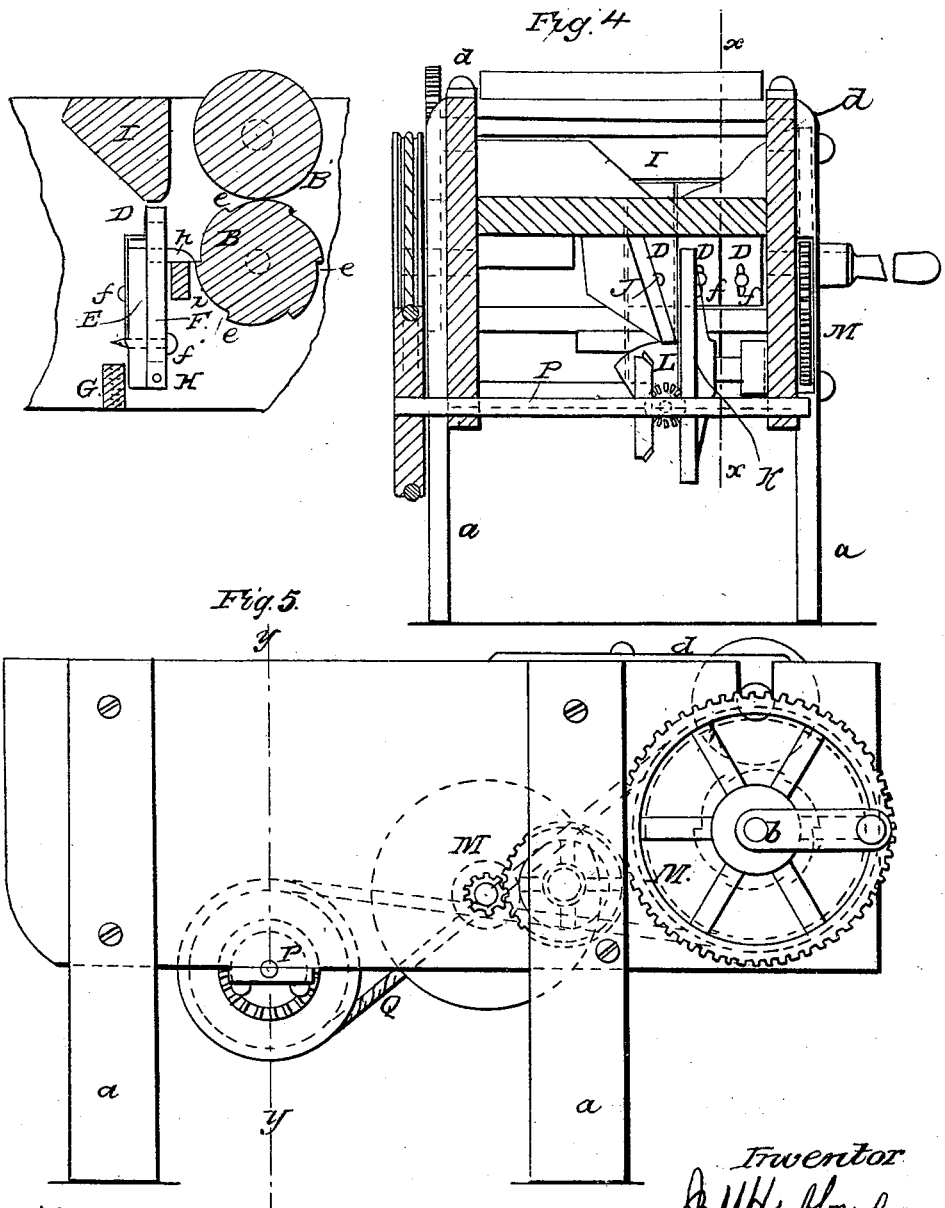
Witnesses
Inventor

UNITED STATES PATENT OFFICE.

J. M. HUBBARD, OF WEST HAVEN, CONNECTICUT.

IMPROVEMENT IN MACHINES FOR HUSKING CORN.

Specification forming part of Letters Patent No. 51,589, dated December 19, 1865.

*To all whom it may concern:*

Be it known that I, J. M. HUBBARD, of West Haven, in the county of New Haven and State of Connecticut, have invented a new and Improved Machine for Husking Corn; and I do hereby declare that the following is a full, clear, and exact description thereof, which will enable those skilled in the art to make and use the same, reference being had to the accompanying drawings, forming part of this specification, in which—

Figure 1:
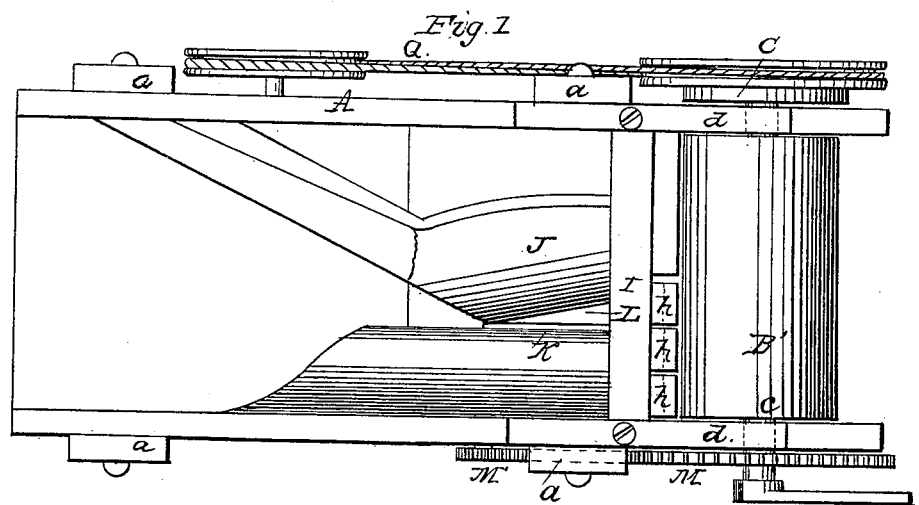
Figure 2:
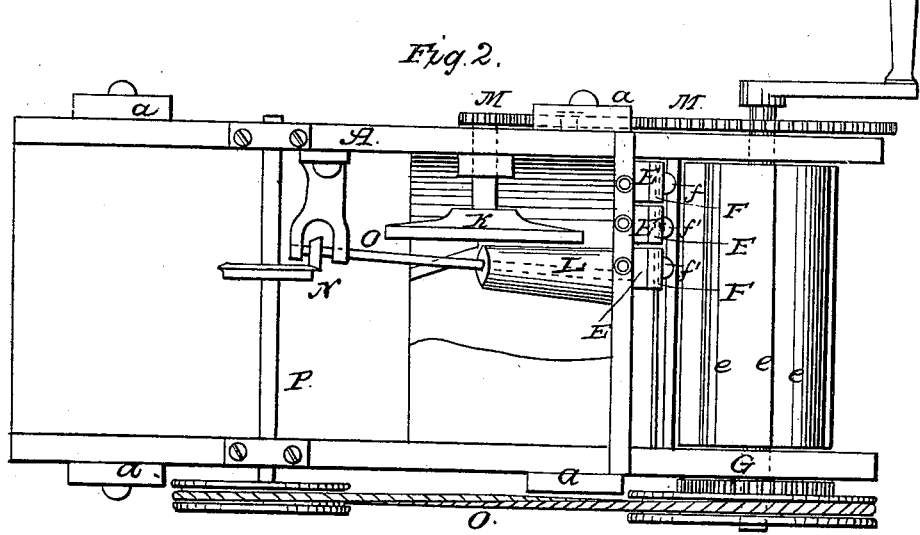

Figure 1, Sheet No. 1, is a plan or top view of my invention; Fig. 2, an inverted plan or under view of the same; Fig. 3, Sheet No. 2, a longitudinal vertical section of a portion of the same, taken in the line $x\,x$, Fig. 4; Fig. 4, a transverse vertical section of the same, taken in the line $y\,y$, Fig. 5; Fig. 5, a side view of the same.

Similar letters of reference indicate corresponding parts.

The invention relates to a new and improved machine for stripping the husks from Indian corn and cutting the ears from the stalks.

The invention consists in the employment or use of a series of knives arranged with rollers in such a manner as to cut the ears from the stalks and separate the latter from the former.

This invention consists, further, in using a wheel and one or more rollers arranged in such a manner as to strip the husks from the ears.

A represents a rectangular box, which is supported at a suitable height by legs $a$ or a proper framing, and B B' are two rollers, which are placed at one end of said box and one over the other in the same axial plane. The lower roller, B, has its shaft $b$ working in fixed bearings; but the upper roller, B', has its shaft $c$ fitted in bearings with springs $d$ resting upon it, which admit of a certain degree of play or a rising-and-falling adjusting movement of said roller. The upper roller has a smooth periphery, but the lower one has longitudinal shoulders or projections $e$ upon it, extending its whole length. The power is applied to the lower roller, B, and motion is communicated to the upper one therefrom by gears C.

D represents a series of cutters, which are placed side by side in a vertical position, and are attached to blocks E by means of set-screws $f$, so as to be capable of being adjusted higher or lower, as may be desired.

The blocks E are placed against upright bars F, and are connected thereto by screws $f$, which pass through vertical slots in F, which slots allow a certain degree of vertical play of the knives and blocks, the latter having springs G connected to them, which springs have a tendency to keep the knives and blocks down to their lowest position.

The bars F are fitted on a horizontal rod, H, the latter passing through the lower parts of the former, and each block E is provided with a projecting arm, $h$, said arms extending through notches or recesses in the bars F, and passing over a fixed transverse horizontal bar, $i$, in the box A.

In the box A, directly over the bars F, there is secured a beam, I, (shown clearly in Fig. 3.)

The parts above described are for the purpose of cutting the ears from the stalks, and the operation is as follows: The stalks are fed butt-foremost to the rollers B B', which draw them between the beam I and the upper ends of the bars F. The ears of corn cannot pass through the narrow space, and the butts of the ears come in contact with the upper parts of the bars F above the blocks E and force the bars F toward the lower roller, B, so that a shoulder, $e$, on said roller will come in contact with the arm $h$ of the block thus acted upon and raise the block and its knife so as to cut off the ear from the stalk. Thus by this simple arrangement the ears will all be cut from the stalks while the latter are separated from the former in being drawn between the rollers B B'.

The bars F are prevented from being moved toward roller B an unnecessary distance by means of the bars $i$.

The ears of corn, as they are cut from the stalks, drop down into a chamber, J, and are subjected to the action of a wheel, K, which forms a portion of one side of said chamber, and a conical roller, L, which forms the bottom of the chamber. The small end of the roller L is near the center of the wheel K, and said roller has such a relative position with the wheel as to cause the ears of corn to be discharged lengthwise and at the small end of the roller. The wheel K and roller L strip the husks from the ears in the most efficient manner, the wheel being rotated by gears M from the shaft of the lower roller, B, while the conical roller L is rotated by gears N, one being placed on the shaft O of the roller and the other on a shaft, P, which is driven by a belt, Q, from the lower roller, B.

I would remark that any number of knives may be used, according to the size of the machine; and I would also remark that, instead of having the roller B to raise the knives, a supplemental roller may be employed for the purpose; but that would render the machine more complicated without adding in the least to its advantages. I would further remark that two rollers L may be used in connection with wheel K, to strip the husks from the ears.

Having thus described my invention, I claim as new and desire to secure by Letters Patent—

1. The cutters D, attached to blocks E, in combination with the bars F, fitted on the rod H, the arms $h$ of blocks E, and the fixed bar $i$ in the box A, all arranged substantially as and for the purpose set forth.

2. In combination with the parts above specified, the conical rollers L and wheel K, all arranged substantially as and for the purpose specified.

J. M. HUBBARD.

Witnesses:
   OLIVER F. CLARKE,
   M. M. CLARKE.